United States Patent
Conway

(10) Patent No.: US 8,750,316 B2
(45) Date of Patent: *Jun. 10, 2014

(54) SYSTEMS AND METHODS FOR PROVIDING DISTRIBUTED PACKET LOSS CONCEALMENT IN PACKET SWITCHING COMMUNICATIONS NETWORKS

(75) Inventor: Adrian Evans Conway, Weston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 220 days.

This patent is subject to a terminal disclaimer.

(21) Appl. No.: 13/114,471

(22) Filed: May 24, 2011

(65) Prior Publication Data
US 2011/0222548 A1    Sep. 15, 2011

Related U.S. Application Data

(63) Continuation of application No. 10/871,944, filed on Jun. 18, 2004, now Pat. No. 7,971,121.

(51) Int. Cl.
*H04L 12/28* (2006.01)
(52) U.S. Cl.
USPC ........... 370/400; 370/360; 370/473; 370/474; 714/747
(58) Field of Classification Search
None
See application file for complete search history.

(56) References Cited

U.S. PATENT DOCUMENTS

| | | |
|---|---|---|
| 5,526,366 A | 6/1996 | Jarvinen et al. |
| 5,918,002 A | 6/1999 | Klemets et al. |
| 5,943,347 A | 8/1999 | Shepard |
| 5,968,197 A | 10/1999 | Doiron |
| 6,230,296 B1 | 5/2001 | Hanko et al. |
| 6,357,028 B1* | 3/2002 | Zhu ............................... 714/751 |
| 6,421,802 B1 | 7/2002 | Schildbach et al. |
| 6,597,961 B1 | 7/2003 | Cooke |
| 6,674,760 B1 | 1/2004 | Walrand et al. |
| 6,851,084 B2 | 2/2005 | Pattavina |
| 6,973,425 B1 | 12/2005 | Kapilow |
| 7,013,267 B1 | 3/2006 | Huart et al. |
| 7,031,926 B2 | 4/2006 | Makinen et al. |
| 7,039,117 B2 | 5/2006 | Chan |
| 7,127,399 B2 | 10/2006 | Hama et al. |
| 7,363,569 B2 | 4/2008 | Pendakur et al. |
| 7,529,673 B2 | 5/2009 | Makinen et al. |
| 7,971,121 B1* | 6/2011 | Conway ........................ 714/747 |

(Continued)

FOREIGN PATENT DOCUMENTS

WO    WO 03/017561 A1    2/2003

OTHER PUBLICATIONS

International Telecommunication Union Recommendation G.729: "General Aspects of Digital Transmission Systems," Mar. 1996; 39 pages.

(Continued)

*Primary Examiner* — Ayaz Sheikh
*Assistant Examiner* — Hai-Chang Hsiung

(57) ABSTRACT

A communications system (100) includes a packet switching network (130) configured to transfer a stream of information packets from a source (110) to a destination (120). The communications system (100) also includes at least one loss concealment processor (140) configured to perform packet loss concealment on the stream of information packets as the stream passes through an intermediate point within the packet switching network (130).

20 Claims, 3 Drawing Sheets

(56) References Cited

U.S. PATENT DOCUMENTS

| | | | |
|---|---|---|---|
| 2002/0152440 | A1 | 10/2002 | Yona et al. |
| 2003/0108176 | A1* | 6/2003 | Kung et al. .............. 379/211.02 |
| 2003/0161306 | A1* | 8/2003 | Hardy .......................... 370/389 |
| 2004/0034492 | A1* | 2/2004 | Conway ......................... 702/81 |
| 2004/0228325 | A1* | 11/2004 | Hepworth et al. ............ 370/352 |
| 2005/0015703 | A1 | 1/2005 | Terry et al. |
| 2007/0016837 | A1 | 1/2007 | Candes et al. |

OTHER PUBLICATIONS

Jeng et al.: "Concealment of Bit Error and Cell Loss in Inter-frame Coded Video Transmission," IEEE International Conference on Communications on Jun. 23-26, 1991; pp. 496-500, vol. 1.

Park et al.: "A Simple Concealment for ATM Bursty Cell Loss," IEEE Transactions on Consumer Electronics, vol. 39, No. 3; Jun. 11, 1993; pp. 704-710.

Raychaudhuri et al.: "ATM Transport and Cell-Loss Concealment Techniques for MPEG Video," IEEE International Conference on Acoustics, Speech, and Signal Processing on Apr. 27-30, 1993; pp. I-117-I-120, vol. 1.

Feng et al.: "Cell Loss Concealment Method for MPEG Video in ATM Networks," IEEE Global Telecommunications Conference on Nov. 13-17, 1995; vol. 3; pp. 1925-1929.

Sanneck et al.: "A New Technique for Audio Packet Loss Concealment," IEEE Global Telecommunications Conference on Nov. 18-22, 1996; pp. 48-52.

Shirani et al.: "Packet Loss Concealment in Baseline JPEG Coded Images," IEEE Symposium on Advances in Digital Filtering and Signal Processing on Jun. 5-6, 1998; pp. 16-19.

Hasan et al.: "A Cascaded Map-Based Linear Prediction (CMAP-LP) Error Concealment Technique for Consecutive Block Losses," IEEE International Symposium on Circuits and Systems on May 6-9, 2001; pp. II-329-II-332, vol. 2.

Cheng et al.: "A Nurbs-Based Error Concealment Technique for Corrupted Images From Packet Loss," International Conference on Image Processing on Sep. 22-25, 2002; pp. II-705-II-708, vol. 2.

Wah et al.: "Loss Concealments of Subband Coded Images for Real-Time Transmissions in the Internet," IEEE International Conference on Multimedia and Expo on Aug. 26-29, 2003; pp. 449-452, vol. 2.

Lindblom et al.: "Packet Loss Concealment Based in Sinusoidal Extrapolation," IEEE International Conference on Acoustics, Speech, and Signal Processing on May 13-17, 2002; pp. I-173-I-176, vol. 1.

Xydeas et al.: "Model-Based Packet Loss Concealment for AMR Coders," IEEE International Conference on Acoustics, Speech, and Signal Processing on Apr. 6-10, 2003; pp. I-112-I115, vol. 1.

Rødbro et al.: "Compressed Domain Packet Loss Concealment of Sinusoidally Coded Speech," IEEE International Conference on Acoustics, Speech, and Signal Processing on Apr. 6-10, 2003; pp. I-104-I-107, vol. 1.

Lindblom et al.: "Error Protection and Packet Loss Concealment Based on a Signal Matched Sinusoidal Vocoder," IEEE International Conference on Acoustics, Speech, and Signal Processing on Apr. 6-10, 2003; pp. I-100-I-103, vol. 1.

Wada: "Selective Recovery of Video Packet Loss Using Error Concealment," IEEE Journal on Selected Areas in Communications; vol. 7, Issue 5; Jun. 1989; pp. 807-814.

Ghanbari et al.: "Cell-Loss Concealment in ATM Video Codecs," IEEE Transactions on Circuits and Systems for Video Technology; vol. 39, No. 3; Jun. 1993; pp. 238-247.

Kieu et al.: "Cell-Loss Concealment Techniques for Layered Video Codecs in an ATM Network," IEEE Transactions on Image Processing, vol. 3, No. 5; Sep. 1994; pp. 666-677.

Zhang et al.: "A Cell-Loss Concealment Technique for MPEG-2 Coded Video," IEEE Transactions on Circuits and Systems for Video Technology, vol. 10, No. 4; Jun. 2000; pp. 659-665.

Lee et al.: "A Packet Loss Concealment Algorithm Based on Time-Scale Modification for CELP-type Speech Coders," 2003 IEEE, ICASSP; pp. I-116-I-119.

Gündüzhan et al.: "A Linear Prediction Based Packet Loss Concealment Algorithm for PCM Coded Speech," IEEE Transactions on Speech and Audio Processing, vol. 9, No. 8; Nov. 2001; pp. 778-785.

Perkins et al.: "A Survey of Packet Loss Recovery Techniques for Streaming Audio," IEEE Network; Sep./Oct. 1998; pp. 40-48.

"Packet Loss and Packet Loss Concealment," Nortel Networks Technical Brief; pp. 1-3, year: 2000.

\* cited by examiner

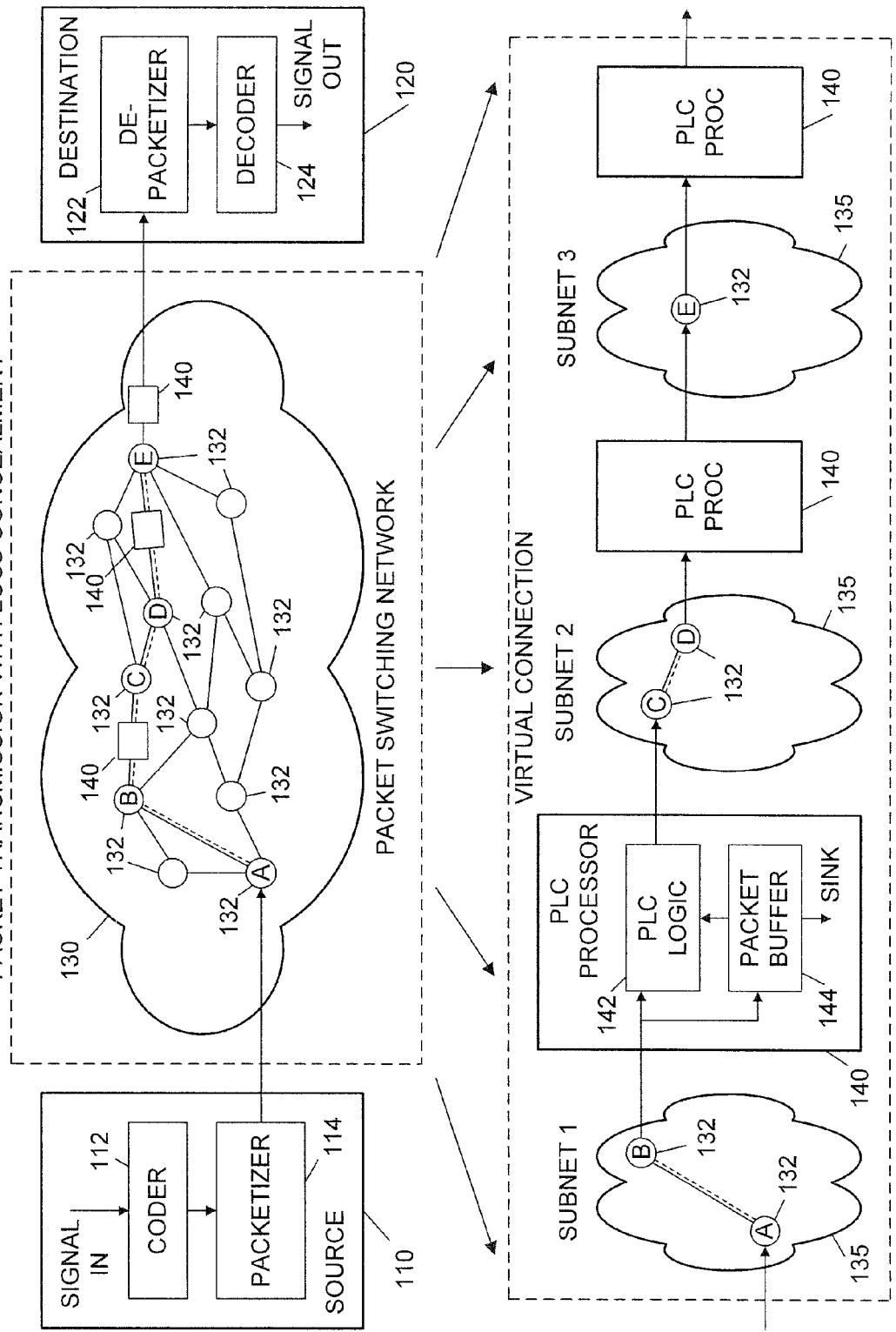

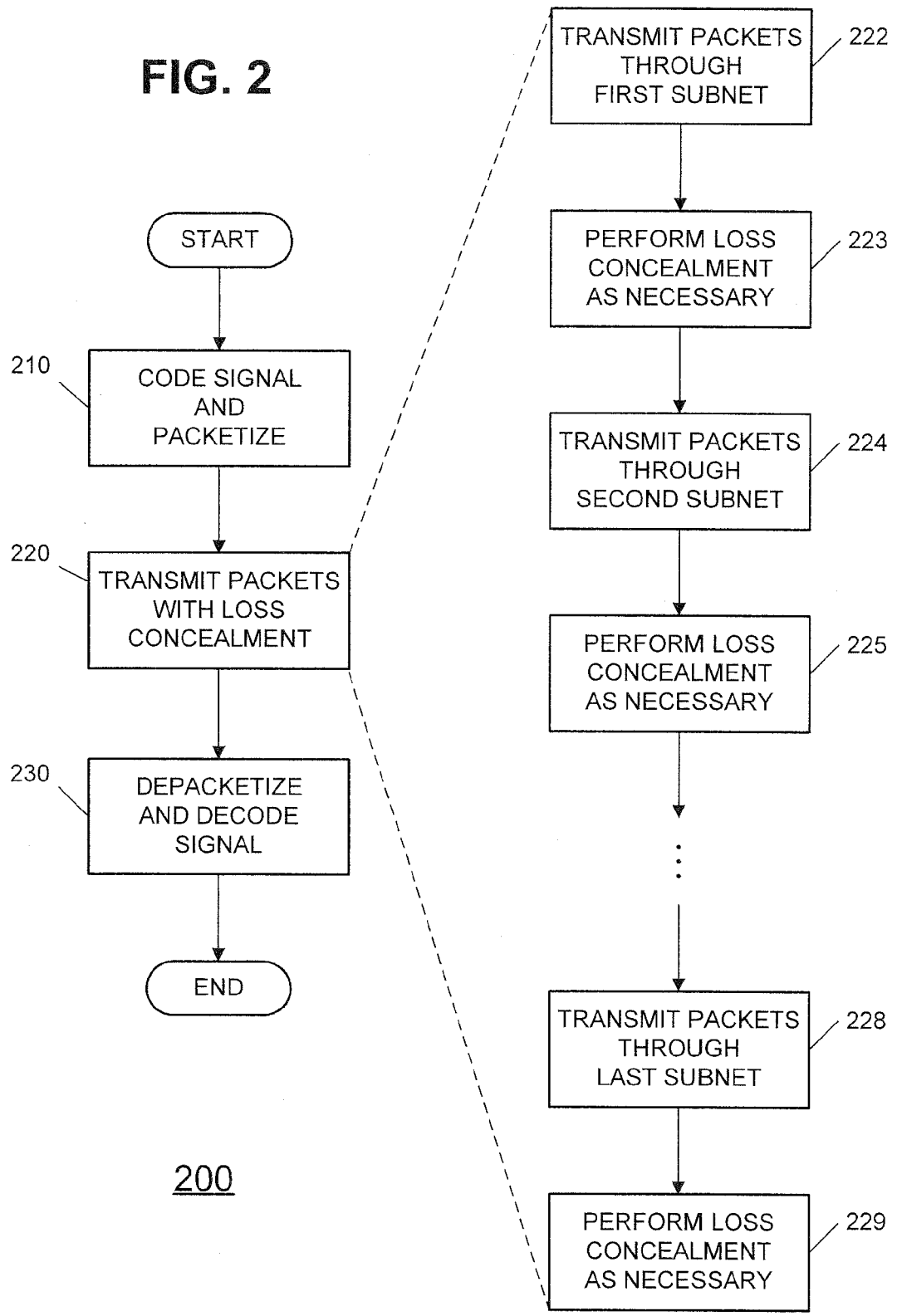

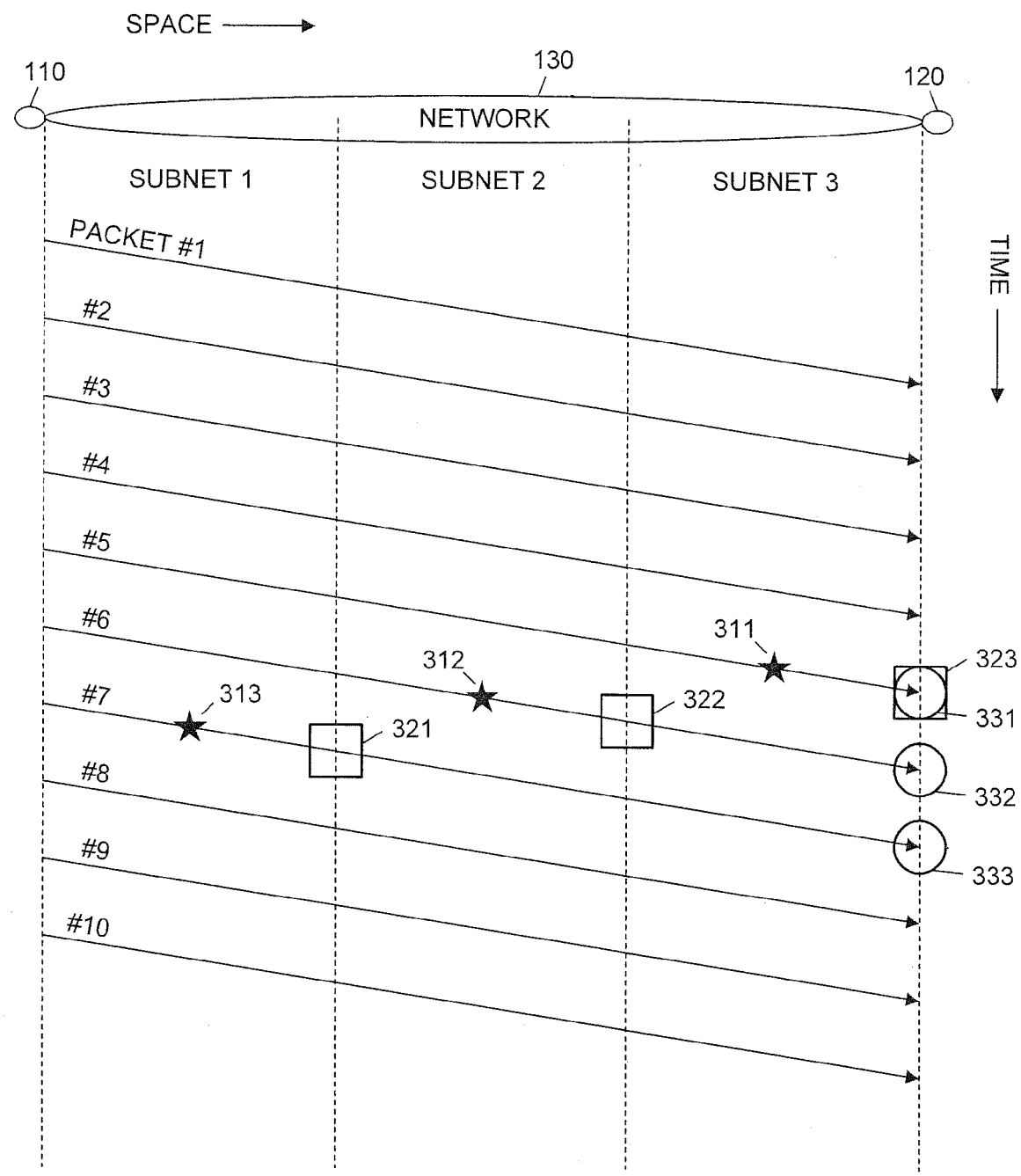

SYSTEMS AND METHODS FOR PROVIDING DISTRIBUTED PACKET LOSS CONCEALMENT IN PACKET SWITCHING COMMUNICATIONS NETWORKS

RELATED APPLICATION

This application is a continuation of U.S. patent application Ser. No. 10/871,944, filed Jun. 18, 2004, which is incorporated herein by reference.

BACKGROUND OF THE INVENTION

A. Field of the Invention

The present invention relates generally to electronic communications and, more particularly, to packet loss concealment in packet switching communications networks.

B. Description of the Related Art

Today, real-time telecommunication signals (e.g., voice, video, audio, data, and multimedia) are increasingly transported via packet switching networks. For example, Internet applications now routinely packetize voice, video, and audio signals and periodically transmit, or stream, the resulting data packets from source to destination. However, when such packetized streams traverse a packet switching network such as the Internet, some of the transmitted packets may be corrupted or lost. For example, packets are sometimes corrupted through bit errors in transmission and packets are sometimes dropped or discarded due to traffic congestion at buffer pools in network switches or routers. Such corrupted and dropped packets constitute loss of information and thus degrade the quality of transmitted signals as perceived by end users.

To improve quality of reception and perception, various error correction and packet loss concealment schemes have been devised. Whereas error correction techniques attempt to fix bit errors or bit erasures in a received signal, packet loss concealment techniques attempt to mask or camouflage missing packets in a received signal by generating and substituting replacement packets when the signal is presented to the end user at the signal destination. Basic packet loss concealment methods simply attempt to replace missing information with information from previous packets, while more sophisticated loss concealment methods synthesize replacement information based on previously received information and/or knowledge of the signal source.

Generally, known loss concealment methods provide acceptable levels of perceptual quality (e.g., toll quality for signals transmitted by commercial providers for paying customers) when packet losses are relatively few and far between. However, when packet loss rates increase (e.g., due to network congestion and/or channel degradation), or when bursts of consecutive packet loss occur, known loss concealment methods can fail to provide acceptable signal quality.

Consequently, a need exists for improved forms of packet loss concealment.

SUMMARY OF THE INVENTION

Systems and methods consistent with the present invention address this and other needs by applying packet loss concealment techniques, not only at a signal destination, but also at one or more intermediate points in a network path between a signal source and a signal destination.

In accordance with the purpose of the invention as embodied and broadly described herein, an exemplary communications system includes at least one loss concealment processor configured to perform packet loss concealment on a stream of information packets as the stream passes through an intermediate location within a packet switching network.

In another implementation consistent with the present invention, a method of communicating information from a source to a destination includes: transmitting a stream of information packets from the source to an intermediate location; performing packet loss concealment on the stream of information packets, at the intermediate location, to form an intermediate stream of information packets; transmitting the intermediate stream of information packets from the intermediate location to the destination; and performing packet loss concealment on the intermediate stream of information packets at the destination.

In yet another implementation consistent with the present invention, a packet switching node for use in a packet switching network includes: an input interface configured to receive streams of information packets from a plurality of communications sources; an output interface configured to selectively transmit the streams of packets to a plurality of communications destinations; and a loss concealment processor configured to perform packet loss concealment on the streams of packets as they pass through the packet switching node.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 depicts an exemplary packet switching communications system consistent with implementations of the present invention;

FIG. 2 depicts an exemplary packet transmission and loss concealment scheme consistent with implementations of the present invention; and FIG. 3 depicts an exemplary packet loss scenario, contrasting the performance of a conventional packet loss concealment scheme with that of an exemplary loss concealment scheme consistent with implementations of the present invention.

DETAILED DESCRIPTION

The following detailed description of the invention refers to the accompanying drawings. The same reference numbers in different drawings may identify the same or similar elements. Also, the following detailed description does not limit the invention. Rather, the scope of the invention is defined by the appended claims and equivalents.

Generally, systems and methods consistent with the present invention employ distributed packet loss concealment. More specifically, exemplary embodiments of the invention apply loss concealment, not only at a signal destination, but also at one or more intermediate points within a packet switching network situated between a signal source and a signal destination.

At each such intermediate point, lost packets (i.e., packets failing to reach the intermediate point in a timely fashion) may be replaced with substitute packets constructed using knowledge of packets previously received at the intermediate point and/or knowledge of the signal source. Consequently, and as is made clear hereinafter, embodiments of the present invention are generally able to use more original signal information in repairing missing signal segments than do conventional schemes employing loss concealment exclusively at a signal destination.

Systems and methods consistent with the present invention thus improve end-to-end perceptual signal quality as compared with conventional implementations.

Exemplary System

FIG. 1 depicts an exemplary packet switching communication system 100 consistent with implementations of the present invention. As shown, system 100 includes a source device 110, including a signal coder 112 and a signal packetizer 114, as well as a destination device 120, including a signal depacketizer 122 and a signal decoder 124. System 100 also includes a packet switching network 130, including a plurality of packet switching nodes 132. As shown, nodes 132 can, according to the invention, be selectively grouped to form logical sub-networks 135, an output of each such sub-network 135 being coupled to a respective one of a plurality of packet loss concealment (PLC) processors 140. Each of PLC processors 140 can include a PLC logic unit 142 and a packet buffer 144 (though, to minimize clutter in FIG. 1, only one of PLC processors 140 is shown to include such elements).

Source device 110 can be any known device capable of generating or otherwise providing a stream of information packets for conveyance via a packet switching communication channel. For example, source device 110 can be a personal computer, a mainframe computer, a network server, a dedicated audio/video device, a digital telephone, etc. Accordingly, source device 110 can include components, such as coder 112 and packetizer 114, configured to convert an analog source signal (e.g., a voice signal, audio signal, video signal, etc.) into an encoded packet stream.

Coder 112 can be any useable signal coder. For example, for voice signals, coder 112 can be compatible with any of the well known voice codecs defined by the International Telecommunication Union (ITU), including the G.711 waveform codec and the G.729 code-excited linear prediction (CELP) codec. Similarly, packetizer 114 can be any known signal packetizer. For example, packetizer 114 can produce information packets conforming to the well known Real-time Transport Protocol (RTP), in which each packet includes signal data in combination with a control header including, among other things, a packet sequence number.

Destination device 120 can be any known device capable of receiving a stream of information packets via a packet switching communication channel. For example, like source device 110, destination device 120 can be a personal computer, a mainframe computer, a network server, a dedicated audio/video device, a digital telephone, etc. Accordingly, destination device 120 can include components, such as depacketizer 122 and decoder 124, configured to recover an analog information signal (e.g., a voice signal, audio signal, video signal, etc.) from a encoded packet stream.

Depacketizer 122 can be any known signal depacketizer, and decoder 124 can be any useable signal decoder. For example, depacketizer 122 can be configured to process RTP information packets, and decoder 124 can be made compatible with codecs such as an ITU-specific codec.

Packet switching network 130, and thus packet switching nodes 132, can be configured to conform to any known type of packet switching technology. For example, network 130 and nodes 132 can conform to the well known X.25 packet switching protocol or to other protocols (ATM, IP, frame relay, etc.). Alternatively, network 130 and nodes 132 can conform to the equally well known Frame Relay protocol.

PLC processors 140 can be configured, as is described in detail hereinafter, to perform any useable type of packet loss concealment. Accordingly, each PLC processor 140 can include elements, such as PLC logic unit 142 and packet buffer 144, configured to assess packet loss and replace missing or corrupted packets based on knowledge of previously received packets and/or knowledge regarding operation of source device 110. In practice, PLC processors 140 can be implemented, in hardware and/or software, as stand-alone devices or as integrated devices (e.g., integrated within the hardware and/or software of a node 132 and/or destination device 120).

Exemplary Processing

In operation, source device 110 produces a stream of discrete information packets (e.g., a stream of packets encoded with voice, audio, video, etc.) for conveyance via packet switching network 130. Switching network 130 then transfers the packet stream, via nodes 132, to destination device 120. Destination device 120 in turn processes the packet stream in an attempt to recover the encoded information (e.g., for presentation to an end user of device 120).

Switching network 130 may apply well known routing techniques in conveying the packet stream from source device 110 to destination device 120. For example, in applications requiring real-time transfer of signals (e.g., Internet telephony and multimedia applications), network 130 can establish a virtual circuit, or virtual connection, between source device 110 and destination device 120. Such a virtual connection includes a chain of nodes 132 through which every packet in the encoded packet stream is routed. An exemplary virtual connection is depicted in FIG. 1 by way of a series of dashed lines connecting five of nodes 132 (labeled A through E in the figure).

In applications for which transfer speed is less critical, a virtual connection may not be necessary. In such case, each packet within the encoded stream can follow a different node path from source device 110 to destination device 120. If so, then destination device 120 collects the individual packets and reassembles and decodes the packet stream using well known techniques.

Whether individual packets traverse a common node path (e.g., a virtual connection), or multiple node paths, transmission of the encoded packet stream can include packet loss concealment, as indicated by a dashed box surrounding network 130 in FIG. 1. Whereas existing systems wait to apply loss concealment at a signal destination (a natural approach, given that packet losses are unpredictable and can occur anywhere within a packet switching network), exemplary system 100 begins loss concealment earlier in the communication process.

More specifically, system 100 employs a distributed loss concealment approach in which concealment techniques are applied, not only at a location following network 130 (e.g., at or just prior to destination device 120), but also at one or more intermediate locations within network 130. Advantageously, and as described in detail hereinafter with respect to FIG. 3, such a distributed approach can provide significant benefit in terms of end user signal perception.

Generally, system 100 can apply loss concealment at any point in network 130 through which consecutive packets in an encoded stream are routed. For example, system 100 can apply concealment at any node 132, or between any two nodes 132, in a virtual connection (i.e., since all packets in a stream are routed through a common path). Alternatively, for applications where virtual connections are not necessary, system 100 can apply concealment at hub sites (i.e., at or near any link or node, such as a gateway node, through which all packets in a stream are routed despite the fact that individual packets in the stream may otherwise traverse different paths).

At each location where loss concealment is to be applied, system 100 includes logic (i.e., hardware and/or software) configured to examine packet sequence numbers and generate substitute packets as necessary (e.g., whenever a packet fails to arrive at a loss concealment location in a timely fashion). According to the invention, loss concealment locations can be established prior to system operation (e.g., by designing-in concealment logic at appropriate points in network 130) and then selectively activated during system operation (e.g., based on source signal type and/or metrics indicative of prevailing network and traffic conditions).

FIG. 1 depicts an example of distributed packet loss concealment applied to the exemplary five-node virtual connection noted above. In the example, system 100 applies loss concealment following the second, fourth and fifth nodes of the virtual connection (i.e., following nodes 132 labeled B, D and E, respectively). Accordingly, a loss concealment processor 140 is shown to follow each of the second, fourth and fifth nodes 132. In practice, concealment processors 140 can be constructed as stand-alone devices or as integrated devices within respective nodes 132.

As shown in FIG. 1, each of loss concealment processors 140 can be viewed as providing loss concealment for a particular sub-network 135 of nodes 132, each sub-network 135 including at least one node 132. Such a perspective can aid understanding of certain benefits provided by exemplary system 100 (and by embodiments of the present invention generally) and is thus invoked hereinafter, in detailed descriptions of FIGS. 2 and 3, to illuminate such benefits.

Generally, each loss concealment processor 140 employs known concealment techniques to construct substitute packets (i.e., replacements for lost packets) based on original packets that arrive at the processor successfully. For example, within each processor 140, a packet buffer 144 can store copies of recently arrived packets (e.g., each buffer 144 can have a fixed packet depth, and copies of newly arriving packets can be pushed into the buffer while copies of older packets are pushed out of the buffer and into a packet sink), and a PLC logic unit 142 can process the stored copies to produce an appropriate substitute packet for each missing packet in a stream.

For example, a PLC logic unit 142 can replace a missing packet with a copy of the last original packet to be received correctly. Alternatively, a missing packet can be replaced with an estimate of the missing packet that is computed, for example, based on copies of previously received packets and/or knowledge of the signal source (e.g., knowledge of spectral characteristics). Those of ordinary skill in the art will appreciate that other loss concealment techniques can be used as well.

Moreover, if other components in system 100 (e.g., components within source device 110 and destination device 120) include loss concealment technology, then PLC logic units 142 can generate substitute packets conforming to that technology. For example, the above noted ITU G.729 voice codec, which can be used in certain embodiments to implement coder 112 and/or decoder 124, includes an integrated packet loss concealment method. Accordingly, in those certain embodiments, PLC logic units 142 can generate G.729-compatible substitute packets.

FIG. 2 depicts distributed packet loss concealment, according to the invention, in flow chart form. In FIG. 2, an exemplary packet transmission process 200 begins with a source signal being coded and packetized (e.g., by source device 110) to provide a stream of information packets (act 210). The information packets are then transmitted (e.g., via network 130) with packet loss concealment (act 220). Specifically, the packets are transmitted via an arbitrary number of sub-networks (e.g., sub-networks 135), and loss concealment is applied (e.g., by a PLC processor 140) following packet transmission through each sub-network (acts 222, 223, 224, 225, 228, 229). Subsequently, the transmitted packets are depacketized and decoded (e.g., by destination device 120) to recover an estimate of the original encoded signal (act 230). In a physical implementation, the various acts shown in FIG. 2 may implemented as a pipeline.

Advantages provided by the above described and other embodiments of the present invention can be seen in FIG. 3, in which a space-time diagram 300 depicts an exemplary stream of ten encoded packets, numbered sequentially from 1 to 10, traveling from source device 110 to destination device 120, via switching network 130. In the figure, three stars 311, 312, 313 indicate that three consecutive packets, numbered 5, 6 and 7, are lost at three different locations within network 130. More specifically, the packets numbered 5, 6 and 7 are shown to be lost within, respectively, first, second and third logical partitions of network 130 (e.g., the first, second and third sub-networks 135 depicted in FIG. 1).

According to the invention, intermediate loss concealment is applied at a location following each of the first, second and third logical partitions. Thus, loss concealment following the first logical partition can repair lost packet number 7 (as indicated by a square 321 in FIG. 3) using knowledge of packets numbered 1 through 6 (each of which is shown to pass successfully through the first logical partition). Similarly, loss concealment following the second logical partition can repair lost packet number 6 (as indicated by a second square 322 in FIG. 3) using knowledge of packets numbered 1 through 5 (each of which is shown to pass successfully through the first and second logical partitions), and loss concealment following the third logical partition can repair lost packet number 5 (as indicated by a third square 323 in FIG. 3) using knowledge of packets numbered 1 through 4 (each of which is shown to pass successfully through each of the first, second and third logical partitions).

By contrast, if loss concealment is applied only at destination device 120 (as indicated by three circles 331, 332, 333 in FIG. 3), then repair of lost packet number 7 cannot make use of packets numbered 5 and 6 (i.e., since packets 5 and 6 are lost prior to reaching destination device 120), and repair of lost packet number 6 cannot make use of packet number 5. Thus, distributed loss concealment according to the present invention can improve end-to-end perceptual performance as compared to prior art systems, inasmuch as original signal information is generally more available at intermediate points within network 130 than at destination device 120 (i.e., since packet losses that occur in later logical partitions are not seen at intermediate loss concealment points positioned after earlier logical partitions).

More generally, consider a packet stream including an arbitrary number, N, of information packets, numbered sequentially from 1 to N. Then, assuming the N packets are transmitted, in order, across a switching network that can be viewed as an arbitrary number, S, of sub-networks, a metric indicative of packet loss is easily defined. Specifically, let $\delta(n,s)=1$, if a particular packet n is lost or discarded in a particular sub-network s, and let $\delta(n,s)=0$ otherwise.

Then, for any given packet m lost in a particular sub-network s, loss concealment applied at an intermediate point following sub-network s, and preceding sub-network s+1, can construct a substitute packet based on all previous packets that arrive successfully at the intermediate point (i.e., based on all packets n such that $1 \leq n < m$ and $\delta(n,i)=0$ for all $i=1$ to s). By contrast, concealment applied only at signal destination must construct a substitute packet based solely on previous packets that successfully traverse the entire network (i.e., based on all packets n such that $1 \leq n < m$ and $\delta(n,i)=0$ for all $i=1$ to S).

Thus, intermediate loss concealment according to the invention employs at least as much information in repairing a lost packet than does existing loss concealment (i.e., since s is, by definition, less than or equal to S in the equations of the preceding paragraph). In practice, systems constructed in accordance with the invention will generally, as compared to conventional systems, apply more original signal information in repairing lost packets, and will thus provide improved quality of transmitted signals as compared to conventional systems.

CONCLUSION

Systems and methods consistent with the present invention employ distributed packet loss concealment, whereby loss concealment techniques are applied at one or more intermediate points in a packet switching network and at a point following the packet switching network. Consequently, embodiments of the present invention use more original signal information in repairing missing signal segments than do conventional destination-only concealment schemes. Accordingly, implementations consistent with the present invention can provide improved quality of signal perception as compared with prior art loss concealment schemes.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While series of acts have been described with regard to certain of the figures, the order of the acts can be varied in other implementations consistent with the present invention, and non-dependent acts can be implemented in parallel.

No element, act, or instruction used in the description of the present invention should be construed as critical or essential to the invention unless explicitly described as such. As used herein, the article "a" is intended to include one or more items. Where only one item is intended, the term "one" or similar language is used.

The scope of the invention is not limited to the foregoing description, and is instead defined by the appended claims and their equivalents.

What is claimed is:

1. A non-transitory computer readable medium to store instructions, the instructions comprising:
   one or more instructions that, when executed by one or more devices, cause the one or more devices to:
      receive, from one or more first nodes, a first subset of packets, of a stream of packets transmitted from a source to a destination via a plurality of paths within a communications network,
      the communications network including:
         the one or more first nodes connected to the source,
            the one or more first nodes being different from the source,
         a plurality of second nodes,
            the plurality of second nodes being different from the one or more first nodes, and
            the plurality of second nodes being connected via the one or more devices to the one or more first nodes, and
         one or more third nodes connecting the plurality of second nodes to the destination,
            the one or more third nodes being different from the plurality of second nodes and the destination, and
            each path, of the plurality of paths, including one or more second nodes of the plurality of second nodes;
      store a copy of the first subset of packets in a memory of the one or more devices;
      transmit, via one or more of the plurality of second nodes and via the one or more third nodes, the first subset of packets toward the destination;
      receive, from the one or more first nodes, a second subset of packets of the stream of packets;
      determine that the second subset of packets is associated with a lost packet;
      perform, based on one of a source signal type or a metric indicating a current network condition, a packet loss concealment operation;
      process, based on performing the loss concealment operation, the stored copy of the first subset of packets to form a substitute packet; and
      forward, via the one or more of the plurality of second nodes and via the one or more third nodes, the second subset of packets, including the substitute packet, toward the destination.

2. The non-transitory computer readable medium of claim 1, where the communications network further includes:
   a first sub-network that includes the one or more first nodes, and
   a second sub-network that includes the one or more third nodes,
      the first sub-network and the second sub-network logically partitioning the communications network to form, via the plurality of paths, a virtual connection between the source and the destination.

3. The non-transitory computer readable medium of claim 1, where the communications network employs at least one of:
   an X.25 packet switching protocol, or
   a frame relay packet switching protocol.

4. The non-transitory computer readable medium of claim 1, where the one or more instructions to transmit the first subset of packets include:
   one or more instructions that, when executed by the one or more devices, cause the one or more devices to transmit the first subset of packets using a first switching protocol; and
   where the one or more instructions to forward the second subset of packets include:
      one or more instructions that, when executed by the one or more devices, cause the one or more devices to forward the second subset of packets, including the substitute packet, using a second switching protocol that differs from the first switching protocol.

5. The non-transitory computer readable medium of claim 1, where a second node, of the plurality of second nodes, forms another substitute packet based on content included in a last, correctly received packet from the stream of packets.

6. The non-transitory computer readable medium of claim 1, where the stream of packets is associated with at least one of:
   an encoded voice signal, an encoded audio signal, or
an encoded video signal.

7. The non-transitory computer readable medium of claim 6, where the stream of packets is associated with the encoded voice signal, and
where the encoded voice signal includes at least one of:
a waveform encoded voice signal, or
a code-excited linear predictive encoded voice signal.

8. A system comprising:
a first device to:
receive, from one or more second devices included in a first sub-network, a stream of information packets being transmitted from a source and to a destination, the one or more second devices being different from the source, and
when receiving the stream of information packets, the first device being to:
receive, via the one or more second devices, a first portion of the stream of information packets,
store a copy of the first portion of the stream of information packets in a memory associated with the first device,
transmit, via one or more third devices included in a second sub-network, the first portion of the stream of information packets towards the destination,
receive, via the one or more second devices, a second portion of the stream of information packets,
determine that the second portion of the stream of information packets is associated with a lost information packet,
perform, based on of one or more of a source signal type or a metric indicating a characteristic of a transmission of the stream of information packets, a packet loss concealment operation,
process, based on performing the packet loss concealment operation, the stored copy of the first portion of the stream of information packets to generate a substitute information packet,
insert the substitute information packet in the second portion of the stream of information packets to form a modified second portion of the stream of information packets, and
forward the modified second portion of the stream of information packets towards between the destination via the one or more third devices.

9. The system of claim 8, where each of the source and the destination includes one of:
a voice device,
an audio device,
a video device, or
a packet switching node.

10. The system of claim 8, where the first device is further to:
store a copy of the second portion of the stream of information packets in the memory,
receive, via the one or more second devices, a third portion of the stream of information packets,
process the first portion of the stream of information packets and the second portion of the stream of information packets to generate another substitute information packet,
insert the other substitute information packet into the third portion of the stream of information packets to form a modified third portion of the stream of information packets, and forward the modified third portion of the stream of information packets to the destination via the one or more third devices.

11. The system of claim 8, where the first sub-network and the second sub-network form a virtual connection between the source and the destination.

12. The system of claim 11, where the virtual connection includes a plurality of virtual connections associated with, respectively, a plurality of paths for transmitting the stream of information packets from the source to the destination, and
where each virtual connection, of the plurality of virtual connections, carries a respective portion of the stream of information packets.

13. The system of claim 8, where the first device, when generating the substitute information packet, is to:
generate the substitute information packet further based on spectral characteristics associated with transmitting the stream of information packets from the source to the first device.

14. The system of claim 8, where the first device, when generating the substitute information packet, is to:
determine that the lost information packet is associated with at least one of:
an encoded voice signal,
an encoded audio signal, or
an encoded video signal, and
generate the substitute information packet based on determining that the lost information packet is associated with the at least one of the encoded voice signal, the encoded audio signal, or the encoded video signal.

15. A method comprising:
receiving, by a device and from one or more first nodes in a network, a first portion of a stream of information packets being transmitted from a source to a destination, the one or more first nodes being different from the source, and
the first portion of the stream of information packets including two or more consecutive information packets of the stream of information packets;
storing, by the device, a copy of the two or more consecutive information packets in a memory associated with the device;
transmitting, by the device, the first portion of the stream of information packets towards the destination via a plurality of second nodes;
receiving, by the device and via the one or more first nodes, a second portion of the stream of information packets;
determining, by the device, that the second portion of the stream of information packets is associated with a lost information packet;
performing, by the device, a packet loss concealment function based on a source signal type associated with transmitting the stream of information packets from the source to the destination;
performing, by the device, the packet loss concealment function on the second portion of the stream of information packets,
performing the packet loss concealment on the second portion of the stream of information packets including:
processing the stored two or more consecutive information packets to generate a substitute information packet, and
inserting the substitute information packet in the second portion of the stream of information packets to form a modified second portion of the stream of information packets; and transmitting, via the one or more second nodes, the modified second portion of the stream of information packets towards the destination, the one or more first nodes, the plurality of second nodes, and the device forming a plurality of paths through a network, and each path, of the plurality of paths, including the device.

16. The method of claim 15, where the stream of information packets includes at least one of:
an encoded voice signal,
an encoded audio signal, or
an encoded video signal.

17. The method of claim 15, where:
the network includes an input sub-network that includes the one or more first nodes and an output sub-network that includes the one or more second nodes, and
the input sub-network and the output sub-network logically partition the network to form a virtual connection between the source and the destination.

18. The method of claim 15, where performing the packet loss concealment function on the second portion of the stream of information packets further includes:

including, in the substitute information packet, contents included in an earlier received information packet from the source, and modifying the contents based on a characteristic of a transmission of the second portion of the stream of information packets.

19. The method of claim 15, where the one or more second nodes perform a packet loss concealment function on the modified second portion of the stream of information packets.

20. The method of claim 19, where the network employs at least one of:

an X.25 packet switching protocol, or a frame relay packet switching protocol.

* * * * *